United States Patent [19]

Dare et al.

[11] 4,258,743
[45] Mar. 31, 1981

[54] EXPANDING GATE VALVE HAVING MECHANICALLY SECURED SEATS

[75] Inventors: Roy R. Dare; Robert C. Houlgrave; William S. Shelton, all of Houston, Tex.

[73] Assignee: ACF Industries, Incorporated, New York, N.Y.

[21] Appl. No.: 45,379

[22] Filed: Jun. 4, 1979

[51] Int. Cl.³ .............................................. F16K 43/00
[52] U.S. Cl. ................................... 137/327; 251/167; 251/328; 251/363
[58] Field of Search ................. 137/315, 327; 251/167, 251/327, 328, 360, 363

[56] References Cited

U.S. PATENT DOCUMENTS

| | | | |
|---|---|---|---|
| 494,579 | 4/1893 | Lunken | 251/360 |
| 683,695 | 10/1901 | Lundbom | 251/328 |
| 1,189,086 | 6/1916 | Freeman | 251/360 X |
| 2,502,689 | 4/1950 | Yant | 251/167 |
| 4,059,250 | 11/1977 | Guldener | 251/304 |

*Primary Examiner*—Harold W. Weakley
*Attorney, Agent, or Firm*—Stephen T. Belsheim; Eugene N. Riddle

[57] ABSTRACT

An expanding gate valve having seats (74) which are mechanically secured in place. The valve body has seat pockets which include undercut grooves (78) intersected by a cylindrical body cavity (24) to form a pair of openings (80) to each groove. Each valve seat has a pair of lugs (90) which may be fitted through the openings and into the undercut groove. Subsequent rotation of the seat locks the lugs in the groove to secure the seat in place in its seat pocket. Each seat is able to pivot about an axis extending between the lugs in order to compensate for irregularities in the contact surfaces of the gate or seat.

24 Claims, 6 Drawing Figures

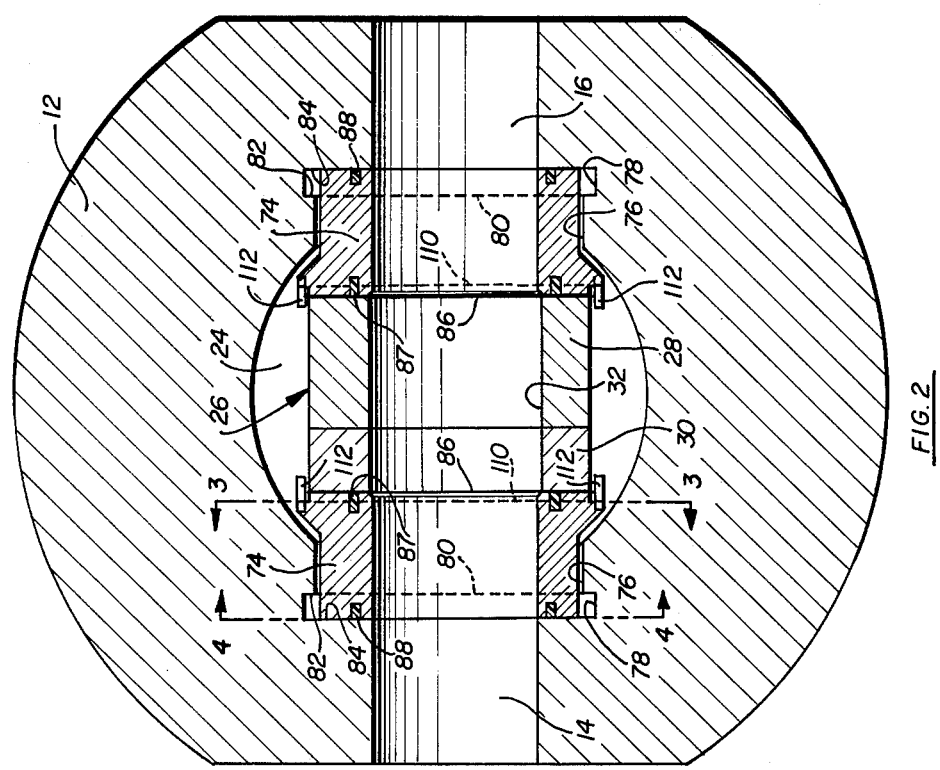
FIG. 2
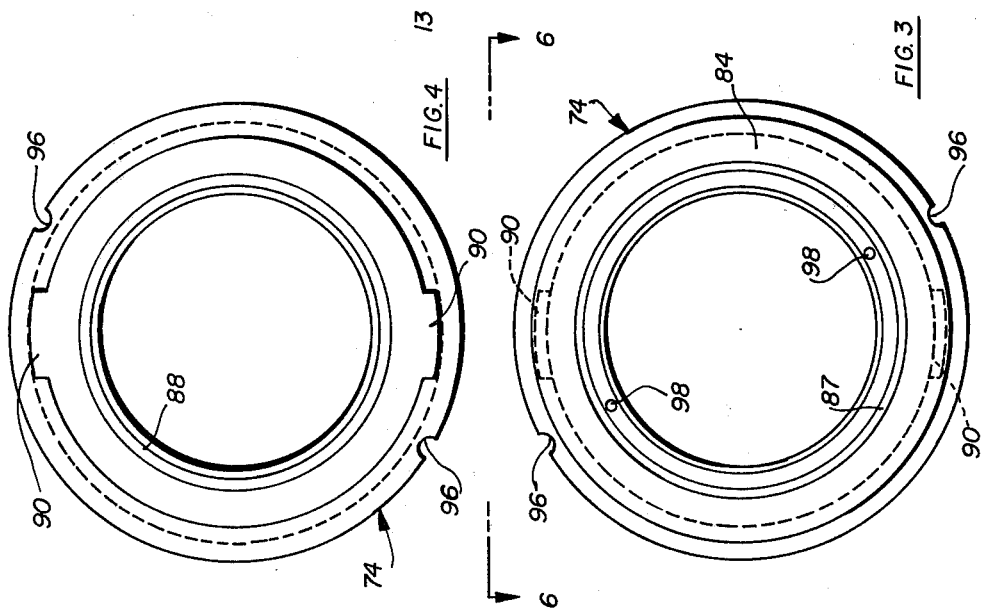
FIG. 3
FIG. 4

EXPANDING GATE VALVE HAVING MECHANICALLY SECURED SEATS

BACKGROUND OF THE INVENTION

This invention relates generally to the field of valves and deals more specifically with positively retained valve seats which find particular utility in expanding type gate valves.

Expanding gate valves usually have fixed valve seats which are pressed in place in their seat pockets. Fixed seats of this type are not able to effectively compensate for lack of parallelism in the surfaces of the gate mechanism and seats, or for the other irregularities and imperfections that are inevitably present in the valve components. Moreover, pressed in seats are not positively held in place and tend to work their way out of the seat pockets, especially after the valve has been cycled repeatedly. Another drawback associated with the pressed in seat is the close tolerances that are required if the seat is to fit properly in place when the valve is assembled. A large percentage of seats fall outside of the acceptable tolerances and must be scrapped or reworked, thereby significantly increasing the cost of the valve. Pressed in seats are also difficult to replace in the field and to repair or recondition after prolonged use.

As an alternative to seats which are pressed in place, valve seats which are mounted for "floating" or limited floating movement toward and away from the gate have been proposed. This type of seat compensates for lack of parallelism and other irregularities in a generally satisfactory manner, although the added complexity of the valve body and seats caused problems with respect to economical manufacture and assembly of the valve. Furthermore, floating seats require a large cavity in the valve body in order to accommodate the various types of inserts that are used to limit the floating movement, and the size and weight of the valve are increased accordingly.

SUMMARY OF THE INVENTION

The present invention is directed to a valve having seats which are mechanically retained in place in an improved manner as compared to the fixed and floating type seats that have been proposed in the past. Although the valve seats disclosed herein are similar in a broad sense to those shown in U.S. Pat. No. 683,695 to Lundbom, they are improved in a number of respects, most notably in their ability to accommodate imperfect surfaces of the gate assembly.

It is an important object of the invention to provide an expanding gate valve in which the seats and seat pockets do not require close tolerances in order to function effectively.

Another object of the invention is to provide valve seats which may be quickly and easily installed and removed and which are positively held in place in their seat pockets.

Yet another object of the invention is to provide an expanding gate valve which is constructed in a manner permitting efficient high volume production without requiring significant scrapping or rework of the valve seats.

Still another object of the invention is to provide an expanding gate valve of the character described which may be manufactured economically without requiring difficult machining operations or complex machine tools.

These and other advantages of the invention are achieved by providing an expanding gate valve having seats which are mechanically held in place in their seat pockets and yet are provided with enough play to compensate for ordinary irregularities in the valve components. In accordance with the invention, each valve seat has a pair of diametrically opposed lugs projecting outwardly therefrom. Each seat pocket in the valve body has an undercut groove which is intersected at diametrically opposed locations by a cylindrical body cavity formed in the valve body. Such intersections provide access to the undercut grooves so that the lugs may be inserted therein and the valve seats may then be rotated to lock the lugs in place, thereby securing the valve seats in their pockets. Tapered surfaces on the lugs interact with the undercut grooves in camming fashion to lock the seats more firmly in place with progressive rotation of the seats. As a particularly important feature of the invention, the lugs form a pivot axis along a diameter of each valve seat so that the seats are free to pivot in order to effectively seal against the gate assembly despite lack of parallelism or other imperfections in the surfaces of the gate assembly or valve seats.

DESCRIPTION OF THE DRAWINGS

In the accompanying drawings which form a part of the specification and are to be read in conjunction therewith:

FIG. 2 is a fragmentary sectional view on an enlarged scale taken generally along line 2—2 of FIG. 1 in the direction of the arrows;

FIG. 3 is an enlarged fragmentary view of one of the valve seats taken generally along line 3—3 of FIG. 2 in the direction of the arrows, but with the seat rotated to a position wherein it can be inserted into or removed from its seat pocket;

FIG. 4 is an enlarged fragmentary view of one of the valve seats taken generally along line 4—4 of FIG. 1 in the direction of the arrows, but with the seat rotated to a position wherein it may be inserted into or removed from its seat pocket;

DETAILED DESCRIPTION OF THE INVENTION

Figure 1:
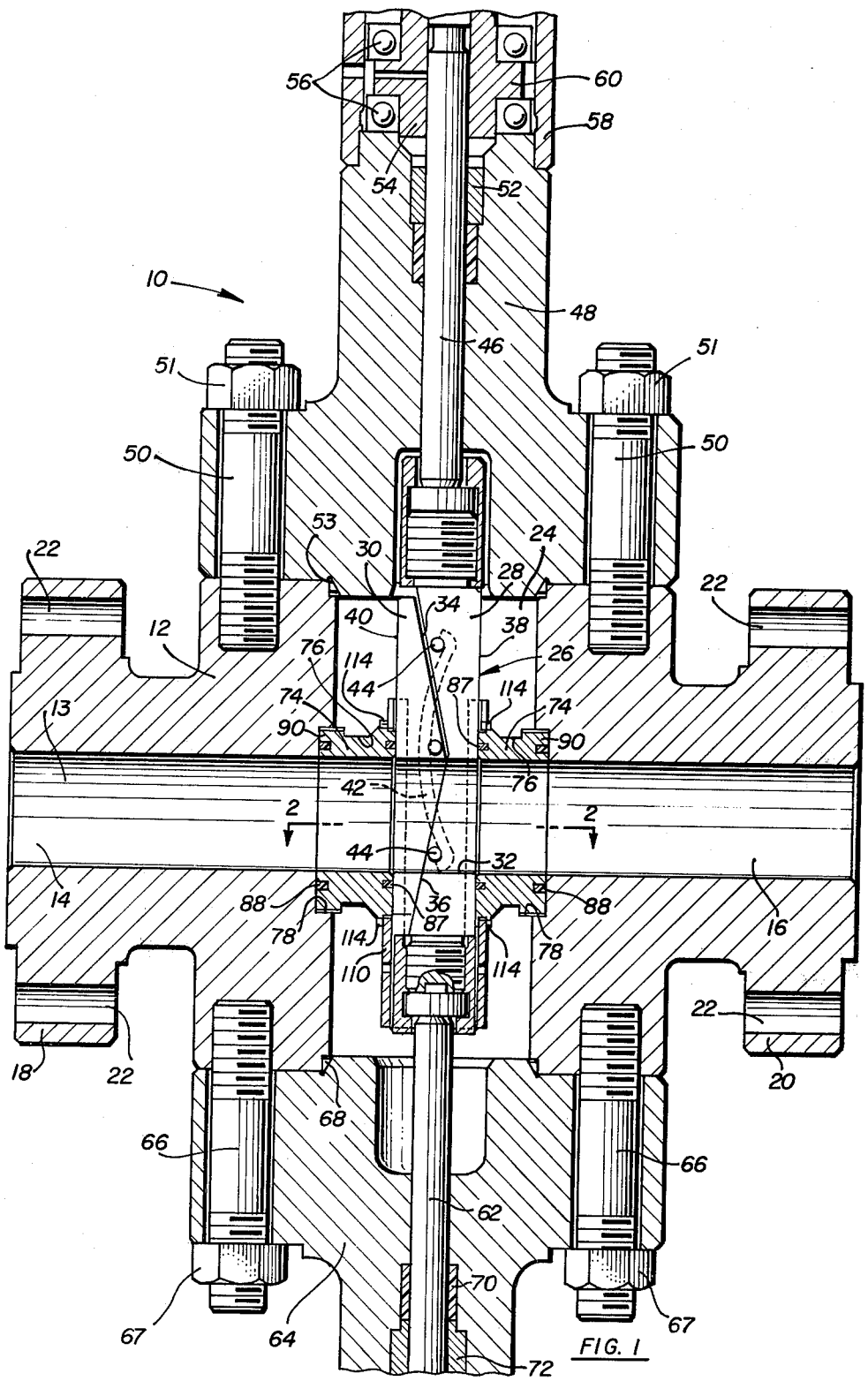
FIG. 1 is a sectional view of an expanding gate valve constructed in accordance with a preferred embodiment of the present invention, with the gate assembly in the open position.

With initial reference to FIG. 1, numeral 10 generally designates an expanding gate valve constructed in accordance with the present invention. Valve 10 includes a valve body 12 presenting a flow passage 13 therethrough which includes an inlet passage 14 and an aligned outlet passage 16. Body 12 has flanges 18 and 20 on the respective inlet and outlet ends thereof, and each flange has a plurality of bolt holes 22 to facilitate connection of the valve with a fluid flowline (not shown). A cylindrical valve chamber or body cavity 24 is formed through body 12 at a location between the inlet and outlet flow passages 14 and 16. Body cavity 24 extends perpendicular to flow passage 13 and intersects therewith at a right angle in a manner that will be described in more detail.

Valve 10 includes an expanding gate assembly which is generally designated by reference numeral 26. Gate assembly 26 is mounted for reciprocal movement in body cavity 24 and may be constructed in a conventional manner. The gate assembly includes a gate 28 and a segment 30 which cooperate with one another in the open position of the valve to provide a port 32 aligned with the flow passage 13. Gate 28 and segment 30 have mating inclined surfaces 34 and 36 which interact with one another in camming fashion to expand the gate assembly in both its opened and closed positions, as will be explained in more detail. Gate 28 has an outwardly facing surface 38 which is a flat surface oriented parallel at all times to a flat outwardly facing surface 40 on segment 30. A pair of curved springs 42 engage pins 44 on opposite sides of gate 28 and segment 30 in a manner to continuously urge the gate and segment toward one another to bias the gate assembly toward a collapsed position.

A valve stem 46 extends upwardly from the top of gate 28 through a valve bonnet 48 which is mounted on top of body 12 by a series of bolts 50 and nuts 51. Packing 52 forms a fluid-tight seal between stem 46 and bonnet 48, while a seal ring 53 forms a fluid-tight seal between the valve body and bonnet. An internally threaded drive sleeve 54 engages stem 46 in threaded fashion and is supported for rotation in bonnet 48 by a pair of thrust bearings 56. Bearings 56 are mounted within a bearing housing 58 which is secured on bonnet 48. Drive sleeve 54 has an enlarged collar portion 60 located between bearings 56. A handwheel or the like (not shown) is connected with sleeve 54 in order to facilitate rotation of the sleeve to move stem 46 and gate 28 upwardly and downwardly between the open and closed positions of the valve.

A balancing stem 62 extends downwardly from the bottom end of gate 28. Stem 62 extends into a base 64 which is secured by bolts 66 and nuts 67 to the bottom of body 12 and is sealed thereto by a seal ring 68. Packing 70 provides a seal between base 64 and stem 62. Balancing stem 62 is reciprocal within a sleeve fitting 72 secured to the bottom of base 64 below packing 70. Although the valve shown herein is a high pressure valve and is equipped with balancing stem 62, it is to be understood that the present invention is useful in other types of valves.

Figure 5:
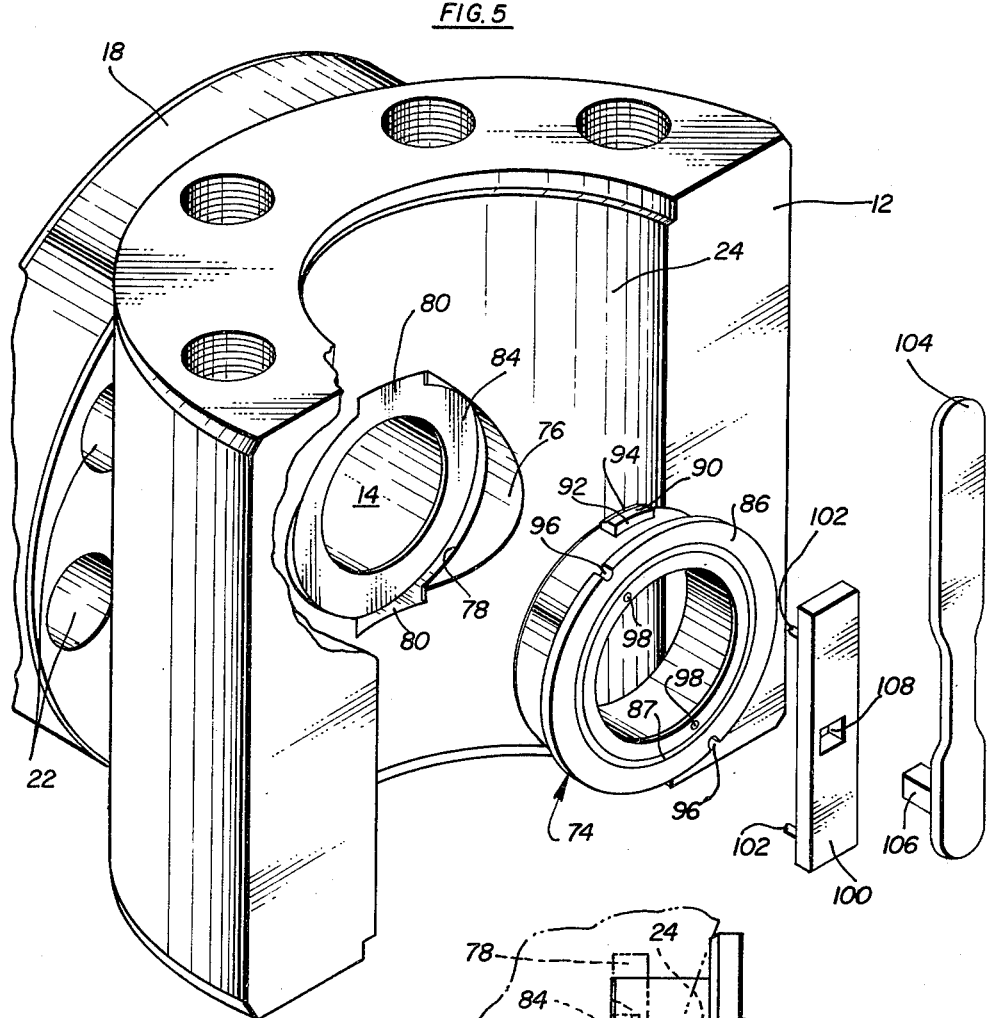
FIG. 5 is an exploded perspective view showing the manner in which the seats are installed and a tool for installing and removing the seats, with portions of the valve body broken away for purposes of illustration.
Figure 6:
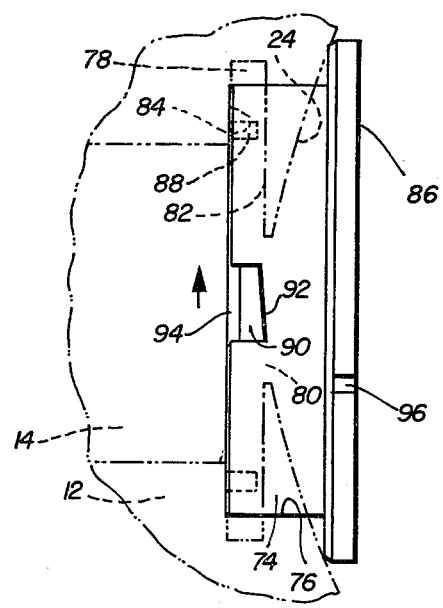
FIG. 6 is a top plan view of one of the valve seats taken generally along line 6—6 of FIG. 4 in the direction of the arrows and showing the seat inserted in the seat pocket prior to rotation of the seat to lock it in place, with the valve body shown in broken lines.

Valve 10 has a pair of valve seats 74 which are constructed identically and which face inwardly toward one another on opposite sides of gate assembly 26. To receive seats 74, a pair of annular seat pockets 76 are formed about flow passage 13 at locations adjacent body cavity 24 on the upstream and downstream sides thereof. Each seat pocket 76 is provided with an undercut annular groove 78 located at the end of the seat pocket remote from gate assembly 26. Each undercut groove 78 is concentric with flow passage 13 and is located outwardly thereof. As shown in FIGS. 2 and 5, body cavity 24 is cylindrical and intersects with each undercut groove 78 at two diametrically opposed locations on the groove in order to form a pair of diametrically opposed openings 80 to each groove. At all other portions of each groove 78, a flat annular surface 82 of the groove faces away from gate assembly 26 and body cavity 24, as best shown in FIG. 6. The back surface of each groove 78 coincides with a flat annular back surface 84 of the corresponding seat pocket 76. Surface 84 is parallel to surface 82 and faces inwardly toward cavity 24. Openings 80 to each undercut groove 78 are arranged directly above one another along a line extending parallel to the longitudinal axis of body cavity 24.

Each valve seat 74 is an annular member having a hub portion presenting a cylindrical opening therethrough which is aligned with the flow passages 14 and 16 and with port 32 in the open position of gate assembly 26. Each seat 74 has on its inner portion an enlarged rim presenting a flat, annular, inwardly facing seating surface 86 for sealing contact with gate assembly 26 in the opened and closed positions thereof. As best shown in FIG. 3, surface 86 carries a seal ring 87 which may be formed of any suitable material capable of effectively sealing with the gate assembly, such as metal "Teflon" material or the like. Alternatively, seal ring 87 may be eliminated and surfaces 86 may seal directly against surfaces 38 and 40 of the gate assembly. The back surface of each valve seat 74 is a flat annular surface provided with a crush ring 88 or another type of seal which is capable of effectively sealing against back surface 84 of the seat pocket.

Each valve seat 74 is provided with a pair of outwardly projecting lugs 90 which are spaced well away from seating surface 86 on the outer end portion of the seat. Lugs 90 project radially outwardly from the valve seat at diametrically opposed locations thereon and are small enough to fit through openings 80 and into undercut groove 78. As best shown in FIG. 6, each lug 90 has a tapered surface 92 facing inwardly toward surface 82 of groove 78. Surface 92 is preferably oriented at an angle of between 1° and 10° relative to seating surface 86 in order to effectively interact with surface 82 in camming fashion, as will be explained more fully. The thickness of each lug 90 in the direction of the flow passage of the valve is slightly less than the depth of groove 78 at the minimum lug thickness, while the maximum lug thickness is slightly greater than the depth of groove 78 in the preferred form of the invention. Each lug 90 has a beveled surface 94 to facilitate entry of the lug into groove 78.

As shown in FIGS. 3 and 5, the rim portion of each valve seat 74 has a pair of diametrically opposed notches 96 formed in its periphery. Inwardly of seal ring 87, surface 86 of each valve seat is provided with a pair of diametrically opposed openings 98. A tool which is used to insert and remove seats 74 includes a bar 100 having a length to substantially span the seating surface 86 of each valve seat. Bar 100 has a pair of spaced apart pegs 102 projecting therefrom to fit closely into openings 98 when the tool is applied to the valve seat. Alternatively, pegs 102 may be arranged to fit in notches 96, thus eliminating the need for openings 98. A detachable handle 104 for the tool has a projection 106 which is square in cross section and which fits closely in a square cavity 108 formed centrally in bar 100.

With reference again to FIGS. 1 and 2 in particular, each valve seat 74 has a seat skirt 110 which is constructed to fit closely around the periphery of the seat at a location adjacent seating surface 86. Each skirt 110 has a pair of flanges 112 on opposite sides thereof to assist in guiding gate assembly 26 between its open and closed positions. A pair of pins 114 (FIG. 1) project outwardly from each seat skirt 110 and fit closely in notches 96 of seats 74 in order to releasably hold the valve seats in their proper position. Skirts 110 fit closely within body cavity 24 and engage body 12 to prevent the skirts from rotating.

Valve 10 is constructed by forming passage 13 through body 12 to provide the flow passage of the valve. Seat pockets 76 and the undercut grooves 78 are then formed about the flow passage, and the cylindrical body cavity 24 is bored through the body to intersect with passage 13 and with each undercut groove 78 in order to form openings 80. It should be pointed out that cavity 24 can be formed first, followed by formation of the flow passage and the seat pockets and undercut grooves. In any event, body cavity 24 intersects with each undercut groove 78 at two diametrically opposed locations in order to form the openings 80 which provide access to grooves 78. This manner of forming openings 80 is preferred because the openings and body cavity 24 are formed in a single operation rather than requiring cutting of the body cavity followed by another operation to form the openings to the undercut groove, such as cutting slots or other passages extending between the body cavity and grooves 78.

After valve body 12 has been formed, seats 74 are installed by inserting them into body cavity 24 and aligning lugs 90 with openings 80. Each valve seat 74 is inserted into its seat pocket 76 with lugs 90 passing through openings 80 into undercut groove 78. Each valve seat is thereafter rotated to move lugs 90 into groove 78 and out of alignment with openings 80. Preferably, rotation of each valve seat 74 is carried out by applying bar 100 to the seat with pegs 102 entering openings 98. Handle 104 is then attached to bar 100 and rotated to effect rotation of the seat in its seat pocket. As is apparent in FIG. 6, progressive rotation of seat 74 in the direction of the arrow causes surface 92 of each lug 90 to cam against surface 82 of groove 78 in wedging fashion to more tightly lock the lugs in the groove in response to progressive rotation of the valve seat. Consequently, increased rotation of each seat 74 locks it in its seat pocket more firmly due to the increased wedging action of lugs 90 in groove 78. In addition, the increased wedging action causes crush ring 88 to be more tightly pressed against surface 84 with progressive seat rotation.

When each seat 74 has been rotated far enough to lock it firmly in place in its seat pocket 76, seat skirts 110 are fitted on the seat with pins 114 of the skirts entering notches 96 of the valve seats. The interaction between pins 114 and notches 96 forms a detent mechanism for each seat 74 which prevents the seat from rotating inadvertently. Seat skirts 110 thus maintain lugs 90 out of alignment with openings 80 in order to positively lock seats 74 in their seat pockets 76.

During service of the valve, gate assembly 26 is moved between the open position shown in FIG. 1 and a closed position wherein fluid flow from passage 14 to passage 16 is precluded. When the handwheel or other operator (not shown) moves stem 46 upwardly toward the open position of FIG. 1, segment 30 contacts a stop in the valve body to prevent further upward movement of the segment. Continued upward movement of gate 28 causes the lower inclined surfaces 36 to cam against one another in a manner to expand the gate assembly outwardly such that surfaces 38 and 40 seal tightly against the seating surfaces 86 of valve seats 74, or against seal rings 87 if provided. When the gate assembly is fully open in the position of FIG. 1, its port 32 is aligned with passages 14 and 16 to provide a continuous flow passage through the valve.

Movement of gate 28 downwardly from the fully open position causes surfaces 36 to slide against one another, with assistance from springs 42, until the gate assembly 26 is in a fully collapsed condition wherein surfaces 38 and 40 are out of contact with seats 74 inwardly thereof. Springs 42 hold the gate assembly in its fully collapsed condition as it moves downwardly from the open position toward the closed position. Downward movement of the gate assembly eventually results in the bottom of segment 30 contacting a stop which prevents further downward movement of the segment. Continued downward movement of gate 28 causes the upper inclined surfaces 34 to slide against one another in camming fashion such that gate assembly 26 is fully expanded when it reaches a fully closed position blocking flow between passages 14 and 16. In the fully closed position of the valve, gate assembly 26 is fully expanded and surfaces 38 and 40 tightly seal against seating surfaces 86 of the valve seats, or against seal rings 87 if provided. When the gate assembly is moved upwardly from the closed position toward the open position, springs 42 maintain it in its collapsed condition until the open position is reached, at which time the gate assembly expands in the manner described previously.

Gate assembly 26 is thus in its fully expanded condition in both the open and closed positions of the valve, and it is maintained in a fully collapsed condition when it is between the open and closed positions. Since valve seats 74 are firmly locked in place, they do not bind against gate assembly 26 in the collapsed condition thereof, and the gate assembly can thus be easily moved between the open and closed positions without excessively dragging against the valve seats.

Despite the tight fit of lugs 90 in the undercut grooves 78, each valve seat 74 is able to pivot to a limited extent about a pivot axis defined by a line extending between the lugs along a diameter of the valve seat. Such pivotal movement of the valve seats provides them with enough play to effectively seal against surfaces 38 and 40 of the gate assembly, even when there is lack of parallelism or other imperfections or irregularities in the faces of the gate assembly or seats. The pivotal motion permitted the seats thus allows them to sealingly accommodate the gate mechanism while compensating for any irregularities therein.

As an alternative to a tight, wedging fit of lugs 90 in grooves 78 with a limited pivotal action, it is contemplated that the lugs will fit loosely in the undercut annular grooves in some situations in order to permit seats 74 to "float" in an axial relation to a limited extent toward and away from the gate assembly. Such a loose fit of lugs 90 in grooves 78 permits the seats to move to a greater extent than does a tight fit; consequently, a loose fit can compensate for more severe irregularities in the contact faces of the gate assembly and seats. Even when a loose fit is provided, the inside surface 92 of each lug should contact surface 82 of groove 78 before seats 74 can float inwardly far enough to drag excessively against the gate assembly in the collapsed condition thereof. Accordingly, the seats are able to accommodate the gate mechanism without binding excessively against it during movement between the open and closed positions. It is noted that the fit of pins 114 in notches 96 locks seats 74 against rotation without significantly hampering their floating movement toward and away from the gate mechanism 26, due to the ability of notches 96 to move axially along pins 114.

Valve seats 74 can be removed for repair or replacement simply by rotating them until lugs 90 line up with openings 80 and then pulling the seats inwardly into body cavity 24. Rotation of the seats is preferably accomplished by applying bar 100 to them and rotating the bar by means of the detachable handle 104. It is thus apparent that the seats can be quickly and easily removed in the field and repaired or replaced without requiring shop facilities or highly skilled service personnel.

What is claimed is:

1. A valve comprising:
   a valve body presenting a fluid flow passage and a body cavity therein, said body cavity intersecting with said flow passage;
   a valve member mounted in said body cavity for movement between open and closed positions relative to the flow passage;
   a seat pocket in said valve body formed about the flow passage at a location adjacent said body cavity, said seat pocket including an undercut groove;
   a pair of openings in the valve body providing access between said body cavity and undercut groove, said openings intersecting with said groove at substantially diametrically opposed locations thereon;
   an annular valve seat in said seat pocket having a seating surface for contacting the valve member to form a seal therewith;
   a single pair of lugs on said valve seat spaced from the seating surface thereof and projecting generally radially outwardly from the seat at substantially diametrically opposed locations thereon, said lugs being sized to fit through said openings for entry into said undercut groove and to fit in the groove upon subsequent rotation of the valve seat, thereby retaining the seat in the seat pocket; and
   said lugs defining a pivot axis for the valve seat extending between the lugs along a diameter of the seat, said seat being pivotal to a limited extent about said pivot axis to permit effective sealing contact of said seating surface against said valve member.

2. A valve as set forth in claim 1, wherein said openings include a first opening intersecting said groove at a first portion thereof and a second opening intersecting said groove at a second portion thereof, said first and second portions being located on a line extending parallel to a longitudinal axis of the body cavity.

3. A valve as set forth in claim 1, wherein said body cavity has a substantially cylindrical portion which intersects said undercut groove at first and second portions thereof to form said openings, said first and second portions being located on a line extending parallel to a longitudinal axis of said cylindrical portion of the body cavity.

4. A valve as set forth in claim 1, including a seat skirt held against rotation in the body cavity and means on said seat skirt engaging said valve seat in a manner to prevent rotation thereof to thereby maintain the lugs out of alignment with said openings during service of the valve.

5. A valve as set forth in claim 1, wherein said lugs fit loosely in said undercut groove to permit limited movement of the valve seat toward and away from the body cavity.

6. A valve as set forth in claim 1, including tool receiving means on said valve seat located outwardly of said fluid flow passage for receiving a tool to facilitate rotation of the valve seat.

7. A valve as set forth in claim 1, including:
   a plurality of tool receiving recesses in the seating surface of said valve seat, said recesses being accessible from said body cavity;
   a tool having a plurality of spaced apart projections adapted to fit in said recesses with said tool substantially spanning the valve seat; and
   a handle connected with said tool and adapted to be turned to effect rotation of the valve seat for installation and removal thereof.

8. In an expanding gate valve having a valve body presenting a flow passage for fluid and a body cavity intersecting said flow passage, an expanding gate assembly in the body cavity movable in a collapsed condition between open and closed positions and disposed in an expanded condition in both the open and closed positions, and contact surfaces on opposite faces of the gate assembly, the improvement comprising:
   a pair of seat pockets formed in the valve body about the flow passage on opposite sides of the body cavity and adjacent thereto, each seat pocket including an undercut groove;
   a pair of openings in the valve body for each undercut groove, said openings providing access between said body cavity and said grooves;
   a valve seat mounted in each seat pocket, each valve seat having a seating surface for sealing contact with the adjacent contact surface of the expanding gate assembly in the open and closed positions thereof;
   a pair of lugs on each valve seat projecting outwardly therefrom at locations spaced away from the seating surface of the valve seat, said lugs being arranged to fit through said openings to enter said grooves and to fit in the grooves upon rotation of the seats to thereby retain the seats in the respective seat pockets; and
   said valve seats each being capable of limited pivotal movement about an axis defined by a line extending between the lugs, thereby permitting the seating surfaces of said valve seats to become oriented parallel to the adjacent contact surfaces of the gate assembly for effective sealing therewith.

9. The improvement set forth in claim 8, wherein:
   the openings in each pair intersect within the corresponding undercut groove at locations diametrically opposed thereon; and
   the lugs in each pair are diametrically opposed on the corresponding valve seat.

10. The improvement set forth in claim 8, wherein said body cavity is substantially cylindrical and intersects with each undercut groove at diametrically opposed locations thereon to form said openings.

11. The improvement set forth in claim 8, including a seat skirt for each valve seat held against rotation in the body cavity and cooperating means on the seat skirts and valve seats for preventing the seats from rotating to thereby maintain the lugs in the undercut groove at locations out of alignment with said openings during service of the valve.

12. The improvement set forth in claim 11, wherein said lugs fit loosely in said undercut grooves and said cooperating means permits movement of each valve seat toward and away from the body cavity.

13. The improvement set forth in claim 11, wherein said cooperating means includes a notch on one of said valve seat and skirt and a projecting pin element on the other of said valve seat and skirt, said pin element registering with said notch when the valve seat is in a predetermined rotative position wherein said lugs are in the undercut groove at locations out of alignment with said openings.

14. The improvement set forth in claim 8, including a lug contacting surface adjacent each undercut groove facing away from the body cavity and a tapered surface on each lug facing toward the body cavity for engagement with the corresponding lug contacting surface to retain the valve seats in the seat pockets, each tapered surface wedging against the corresponding lug contacting surface more tightly as the valve seat is progressively rotated.

15. The improvement set forth in claim 14, including an annular back surface of each seat pocket facing toward the body cavity and an annular seal element carried on each valve seat at a location to seal against said back surface, each seal element being pressed against the corresponding back surface with increased force as the corresponding valve seat is progressively rotated.

16. The improvement set forth in claim 8, including:
a pair of tool receiving openings on each valve seat at substantially diametrically opposed locations thereon outwardly of the flow passage; and
a tool for rotating the valve seats, said tool having spaced apart pegs thereon adapted to be received in the tool receiving openings to effect rotation of the seats upon rotation of the tool.

17. An expanding gate valve comprising:
a valve body presenting a fluid flow passage therethrough;
a pair of spaced apart seat pockets in said valve body formed about the fluid flow passage, each seat pocket including an undercut annular groove located outwardly of the flow passage;
a cylindrical body cavity in said valve body intersecting with the flow passage at a location between the seat pockets and intersecting with each of said undercut grooves in a manner to form openings providing access to the grooves at diametrically opposed locations thereon;
an annular valve seat mounted in each seat pocket, each valve seat having a seating surface facing inwardly toward the body cavity;
a pair of lugs on each valve seat projecting outwardly therefrom at diametrically opposed locations spaced away from the seating surfaces of the seats, said lugs being sized to pass from the body cavity through said openings into the undercut grooves, whereby subsequent rotation of the valve seats positions the lugs in the grooves to hold the seats in the pockets; and
an expanding gate mechanism in the body cavity movable in a collapsed condition between opened and closed positions and disposed in an expanded condition in both the open and closed positions, said gate mechanism having contact surfaces on opposite faces thereof for sealing contact with the seating surfaces of said valve seats when the gate mechanism is in its expanded condition.

18. In an expanding gate valve of the type having a valve body presenting a fluid flow passage and a body cavity intersecting said passage, an expanding gate assembly including a gate and segment which cooperate to move the gate assembly between an expanded condition and a collapsed condition with opposed outer faces of the gate assembly remaining substantially parallel to one another, and means mounting said gate assembly in the body cavity for movement between open and closed positions with the gate assembly disposed in the expanded condition in both the open and closed positions and in the collapsed condition between the open and closed positions, the improvement comprising:
a pair of seat pockets formed in the valve body about the flow passage on opposite sides of the body cavity and adjacent thereto;
a pair of valve seats each having a seating surface for sealing contact with the corresponding outer face of the gate assembly in the expanded condition thereof; and
means mounting said valve seats in the respective seat pockets at a pair of substantially diametrically opposed mounting areas on each seat in a manner permitting limited pivotal movement of each seat about a pivot axis extending between said mounting areas of the seat, thereby allowing the seating surfaces of the seats to become oriented parallel to the outer faces of the gate assembly for effective sealing therewith.

19. A valve as set forth in claim 17, including a seat skirt held against rotation in the body cavity and means on said seat skirt engaging said valve seat in a manner to prevent rotation thereof to thereby maintain the lugs out of alignment with said openings during service of the valve.

20. A valve as set forth in claim 17, wherein said lugs fit loosely in said undercut groove to permit limited movement of the valve seat toward and away from the body cavity.

21. A valve as set forth in claim 17, including tool receiving means on said valve seat located outwardly of said fluid flow passage for receiving a tool to facilitate rotation of the valve seat.

22. A valve as set forth in claim 17, including:
a plurality of tool receiving recesses in the seating surface of said valve seat, said recesses being accessible from said body cavity;
a tool having a plurality of spaced apart projections adapted to fit in said recesses with said tool substantially spanning the valve seat; and
a handle connected with said tool and adapted to be turned to effect rotation of the valve seat for installation and removal thereof.

23. A valve as set forth in claim 17, including a lug contacting surface adjacent each undercut groove facing away from the body cavity and a tapered surface on each lug facing toward the body cavity for engagement with the corresponding lug contacting surface to retain the valve seats in the seat pockets, each tapered surface wedging against the corresponding lug contacting surface more tightly as the valve seat is progressively rotated.

24. A valve as set forth in claim 23, including an annular back surface of each seat pocket facing toward the body cavity and an annular seal element carried on each valve seat at a location t seal against said back surface, each seal element being pressed against the corresponding back surface with increased force as the corresponding valve seat is progressively rotated.

* * * * *